United States Patent
Chen

(10) Patent No.: US 9,571,712 B2
(45) Date of Patent: Feb. 14, 2017

(54) MODULARIZED LIGHTING DEVICE

(71) Applicant: Kaipo Chen, Taoyuan Hsien (TW)

(72) Inventor: Kaipo Chen, Taoyuan Hsien (TW)

( * ) Notice: Subject to any disclaimer, the term of this patent is extended or adjusted under 35 U.S.C. 154(b) by 0 days.

(21) Appl. No.: 14/258,029

(22) Filed: Apr. 22, 2014

(65) Prior Publication Data

US 2014/0218888 A1    Aug. 7, 2014

Related U.S. Application Data

(63) Continuation-in-part of application No. 13/220,720, filed on Aug. 30, 2011.

(30) Foreign Application Priority Data

Mar. 12, 2014    (CN) .......................... 2014 1 0089724

(51) Int. Cl.
| | |
|---|---|
| H04N 5/225 | (2006.01) |
| F21V 23/00 | (2015.01) |
| H04N 7/18 | (2006.01) |
| F21V 33/00 | (2006.01) |
| G08B 13/196 | (2006.01) |

(52) U.S. Cl.
CPC .......... *H04N 5/2257* (2013.01); *F21V 23/003* (2013.01); *F21V 23/007* (2013.01); *F21V 23/009* (2013.01); *F21V 33/0052* (2013.01); *H04N 5/225* (2013.01); *H04N 5/2251* (2013.01); *H04N 5/2252* (2013.01); *H04N 5/2254* (2013.01); *H04N 5/2256* (2013.01); *H04N 7/183* (2013.01); *F21V 33/002* (2013.01); *G08B 13/19619* (2013.01)

(58) Field of Classification Search
None
See application file for complete search history.

(56) References Cited

U.S. PATENT DOCUMENTS

| | | | | |
|---|---|---|---|---|
| 6,812,970 | B1 * | 11/2004 | McBride | 348/372 |
| 6,820,998 | B2 * | 11/2004 | Chen | 362/276 |
| 7,327,254 | B2 * | 2/2008 | Chen | 340/545.2 |
| 7,467,881 | B2 * | 12/2008 | McMillen | 362/364 |
| 8,066,392 | B2 * | 11/2011 | Wang | 362/20 |

(Continued)

FOREIGN PATENT DOCUMENTS

| | | | | | |
|---|---|---|---|---|---|
| EP | | 2570723 A1 | * | 3/2013 | F21V 29/00 |
| JP | WO 2013153738 A1 | * | 10/2013 | F21V 17/02 |
| TW | EP 2273190 A1 | * | 1/2011 | F21K 9/00 |

*Primary Examiner* — David N Werner
(74) *Attorney, Agent, or Firm* — Leong C. Lei

(57) ABSTRACT

A modularized lighting device includes a multifunctional module. The multifunctional module includes a module base a top of which is combined with a substrate to house a sensor and a camera lens in a receiving space of the module base. The module base is provided, on the bottom thereof, with a light emission element included light board that is coupled to the module base. Through a plurality of mounting holes, the module base can be mounted in an interior space of a housing of a variety of lighting fixtures/devices to allow a user to selectively use a single function or multiple functions for easy replacement of components of for example the sensor and the camera lens. Thus, the present invention makes use of the multifunctional module to be applicable to various types of lighting devices to achieve the purposes of enhancing convenience and modularized function selection.

2 Claims, 9 Drawing Sheets

(56) References Cited

U.S. PATENT DOCUMENTS

| | | | | |
|---|---|---|---|---|
| 8,393,757 | B2* | 3/2013 | Uemoto et al. | 362/249.03 |
| 8,820,961 | B2* | 9/2014 | Kim | 362/234 |
| 2004/0201989 | A1* | 10/2004 | Raskas | 362/253 |
| 2006/0028811 | A1* | 2/2006 | Ross et al. | 362/157 |
| 2009/0310342 | A1* | 12/2009 | Chang | 362/205 |
| 2010/0148672 | A1* | 6/2010 | Hopper | 315/113 |
| 2014/0009936 | A1* | 1/2014 | Hata | F21K 9/64 362/235 |
| 2014/0098548 | A1* | 4/2014 | Huang | F21V 21/30 362/362 |
| 2014/0133154 | A1* | 5/2014 | Ju | F21V 29/89 362/294 |
| 2014/0140067 | A1* | 5/2014 | Chen | F21V 17/102 362/294 |

* cited by examiner

MODULARIZED LIGHTING DEVICE

CROSS-REFERENCE TO RELATED APPLICATION

This is a continuation-in-part of U.S. patent application Ser. No. 13/220,720 filed on Aug. 30, 2011 and owned by the present applicant.

TECHNICAL FIELD OF THE INVENTION

The present invention generally relates to a modularized lighting device, and more particularly to one that comprises a multifunctional module arranged inside a housing of a variety lighting fixtures/devices to allow a user to selectively install a sensor or a camera lens so as to achieve the purpose of simple substitute and having various functions of use.

DESCRIPTION OF THE PRIOR ART

The progress of LED (Light-Emitting Diode) technology brings an increase of the number thereof put into use. The manufacturers have devoted themselves to research and development of techniques of energy saving and illumination and also put effort in diversifying the functionality of the related products available in the market, those functions including sensing based operation, camera based surveillance, and remote control. However, those products that are of the variable functions are generally of closed type designs In other words, to meet the needs for several types of functions, a consumer must purchase a variety of different products.

However, an example of a conventional multifunctional LED base device has an interior structure as shown in FIG. 10. The exemplificative device is a lighting device (9) comprising LEDs (93) that are activated by means of result of sensing. Arranged inside the device are a variety of components mounted on a circuit board (92), including the LEDs (93) and a sensor element (94), which are housed in a casing (91) for protection of the components. The sensor element (94) can make a detection of an activation signal to power the plurality of LEDs (93) for lighting so that the period of time of continuous operation can be reduced and energy can be saved. When a user requires an image recording function, an additional device must be purchased for replacement. For a user, disassembling must be done for the original device in order to proceed with replacement. This incurs additional costs of time and money for installation.

This is surely a problem of inconvenience for users having the needs of devices of various functions and it is desired to have a novel lighting device that allows for the achievement of multiple functions and is of convenience of use in order to suit the needs of various users for various functions.

SUMMARY OF THE INVENTION

A primary object of the present invention is to provide a modularized lighting device, which comprises a multifunctional module to be used in combination with a sensor or a camera lens selected by a user and further comprises a substrate mounted to the multifunctional module, whereby through being fixed inside a housing of a light fixture/device, modularization can be achieved for selection of function.

A secondary object of the present invention is that for a light fixture/device that can be selected by a user from a group including a regular light bulb, a ceiling light, an embedded light, a pendant light, to light tube, and a wall light, a multifunctional module provided by the present invention can be mounted in each of the light fixtures/devices of operation therewith.

Compared to the drawbacks of the prior art, the present invention provides a modularized lighting device, which allows a user to select a desired function and to replace components of different functions through the multifunctional module and which can be directly mounted in various types of light fixtures/devices to prevent excessive economic burden of the general consumers and to allow the general consumers to make purchase of only the desired function. As such, each type of lighting devices can achieve different functions through a modularized arrangement. To further expound the technical solution and effectiveness of the present invention, preferred embodiment will be described with reference to the attached drawings.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
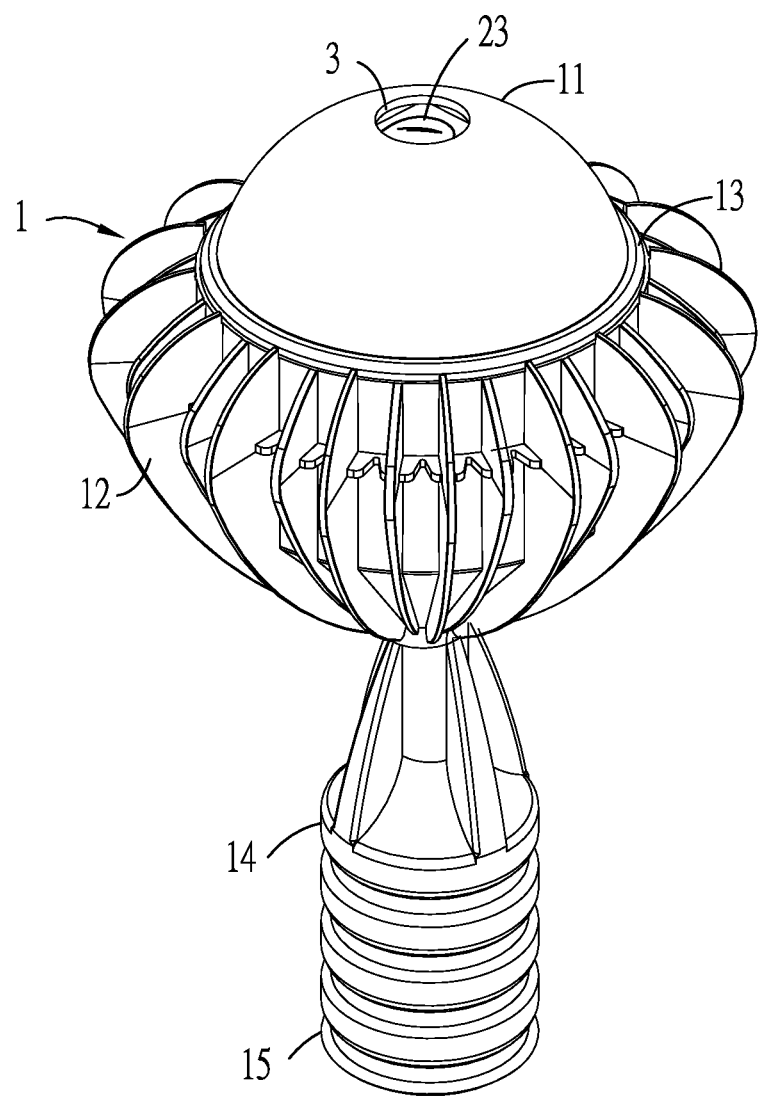
FIG. 1 is a perspective view showing the present invention.
Figure 2:
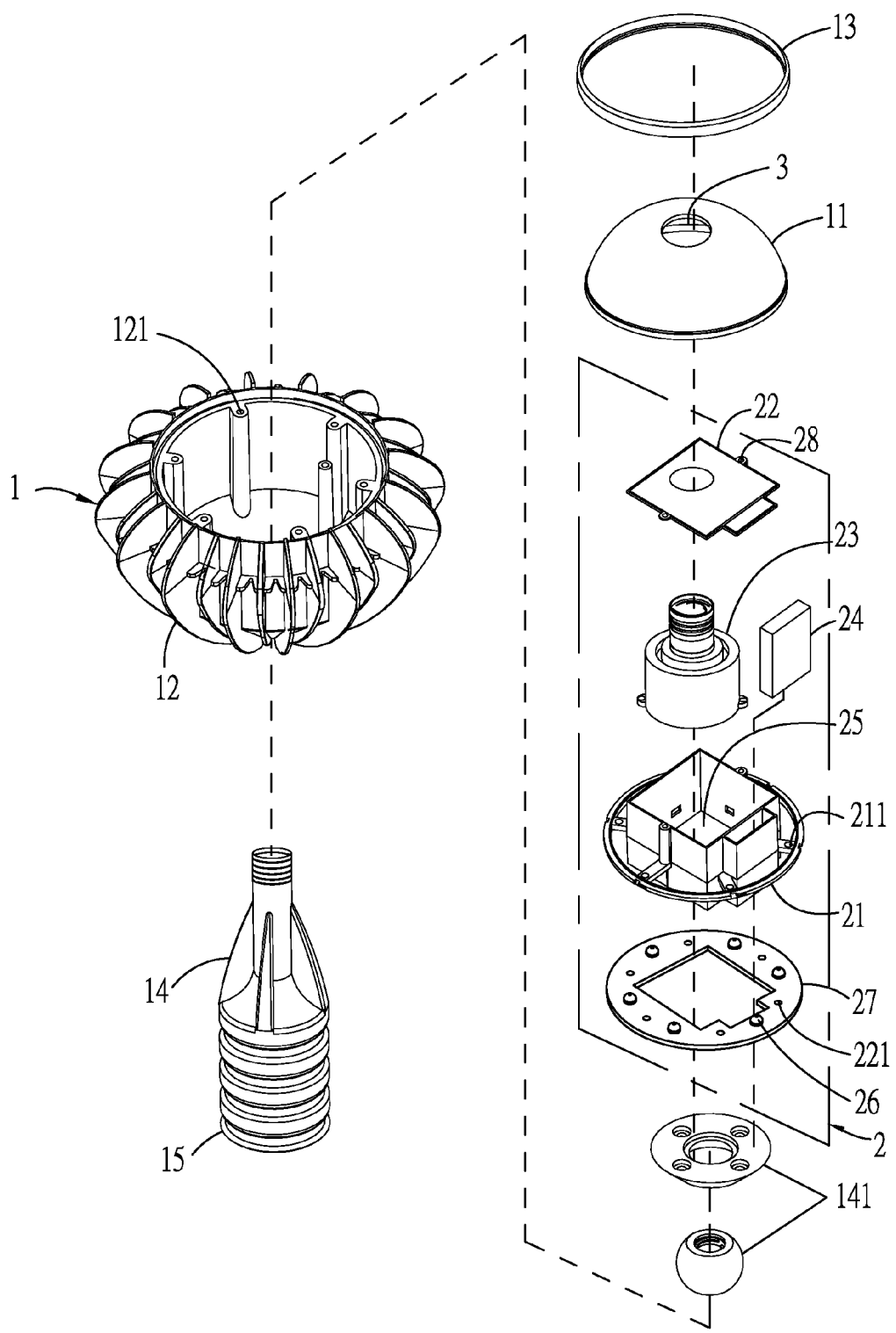
FIG. 2 is an exploded view of the present invention.
Figure 3:
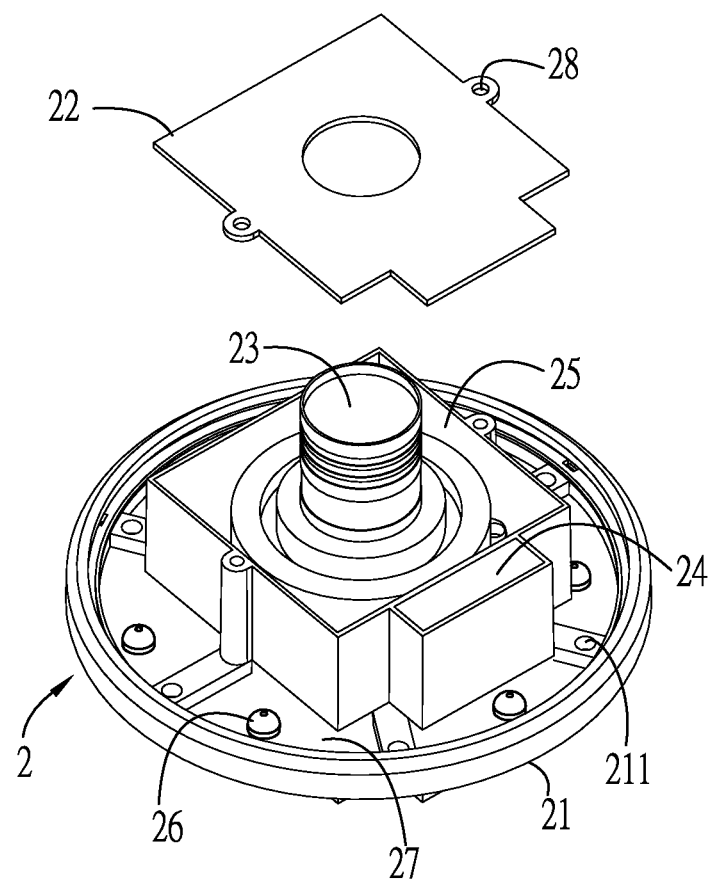
FIG. 3 is a schematic view showing a multifunctional module according to the present invention.

A detailed description will be given hereinafter for a preferred embodiment of the present invention with reference being had to the attached drawings in order to provide a better illustration to the principle and inventive idea of the present invention. Referring to FIGS. 1-3, the present invention provides a modularized lighting device, which generally comprises: a housing (1), which formed by mating and combining an upper housing member (11) to a lower housing member (12). The housing (1) can be made in the form of various lighting fixtures/devices, including a light bulb, an embedded light (31), a ceiling light (32), a pendant light (34), and a light tube (33). An LED light bulb is taken as example of a primary embodiment according to the present invention, which comprises a power input terminal (15) that is rotatably connected by a rotatable joint (141) to the lower housing member (12) for the purposes of adjustment of a range of detection or an angle of image taking, the rotatable joint (141) also having a function for supporting components arranged inside the lower housing member (12); and a multifunctional module (2), which is made up of a module base (21) that has a receiving space (25) combined with a substrate (22) that has threaded holes (28) formed in opposite sides thereof to be coupled by screwing means to threaded hole formed around the receiving space (25) and corresponding thereto so as to close a top opening of the receiving space (25) to protect internal components.

In the instant embodiment of the present invention, those internal components are a camera lens (23) and a sensor (24). The camera lens (23) has an outer circumference over which a rubber-made sleeve is fit and the camera lens (23) is received through an opening defined in the substrate (22) to have the camera lens (23) fixed in the receiving space (25). The sensor (24) is arranged at one side of the camera lens (23) and is also located in the receiving space (25). The arrangement of the substrate (22) protects these components from damages caused by being exposed to the outside environment. The camera lens (23) and the sensor (24) are electrically connected, at a lower end of the receiving space (25), to a circuit board to control operations of the components inside the receiving space (25). The shape of the receiving space (25) can be altered to correspond to different types of arrangement and configuration and is not limited to what disclosed herein. The circuit board can be a regular printed circuit board (PCB), a metal-based printed circuit board, a flexible printed circuit board, a ceramic printed circuit board, and the likes. The circuit board may comprise, mounted thereon, a system-on-chip (SOC) to allow for multiple uses of the multifunctional module (2) corresponding to various components, or alternatively, to provide an arrangement for a single function. For example, in the present invention, detection and image taking are taken as an example for illustrating multiple or single use. In an example, an arrangement is made on the basis of SOC, and then a single multifunctional module (2) can be used to correspond to various functions. Or, for the purposes of cost reduction, the multifunctional module (2) can be limited to individual functions so as to provide a multifunctional module (2) for each individual function. Thus, the present invention is not limited to such an arrangement that the multifunctional module (2) can be connected for a single way or multiple ways; and the electrical connection associated therewith can be done with various forms, such as through pins in combination with socket holes or wire bonding, being not subject to any unnecessary limitations so that a user may make substitute of the sensor (24) or the camera lens (23) according to a desired function to achieve each and simple replacement thereof.

The multifunctional module (2) is arranged inside the lower housing member (12). The upper housing member (11) has an outer rim that is mounted through downward fitting with a ring (13) so as to achieve strengthened mated coupling between the upper housing member (11) and the lower housing member (12). The upper housing member (11) comprises a through hole (3) defined centrally therein for receiving, in a mated manner, the camera lens (23) and the sleeve helps securely hold the camera lens (23) in the through hole (3). The camera lens (23) shows a horizontal positional relationship with respect to the through hole (3).

Figure 4:
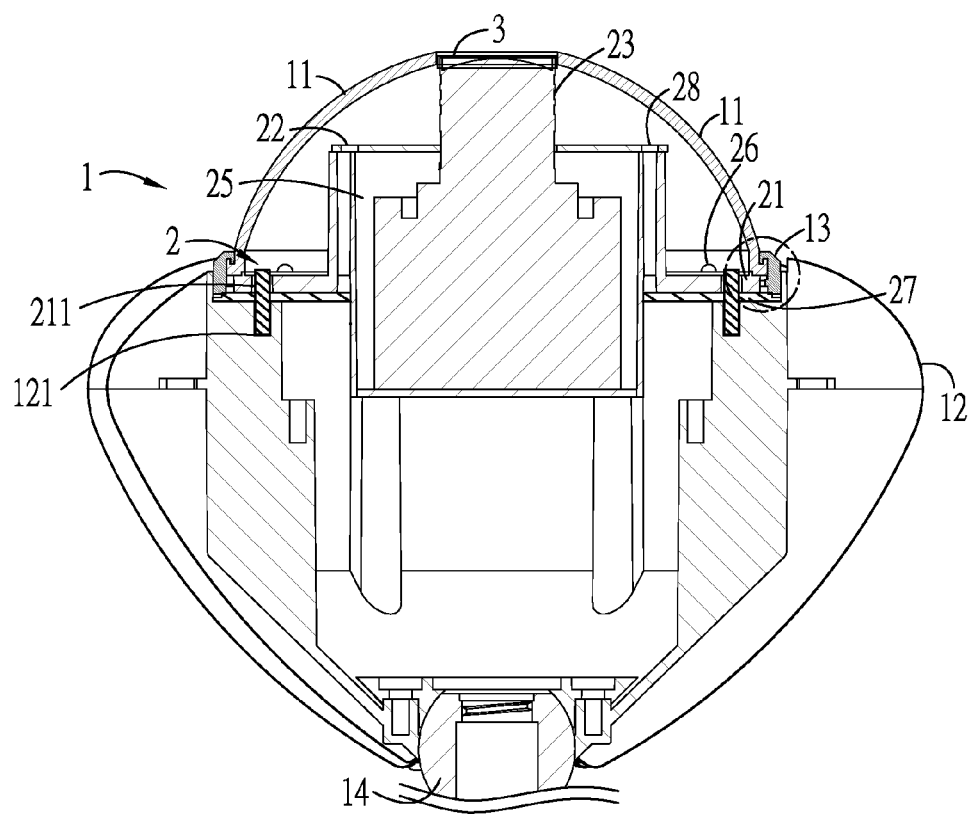
FIG. 4 is a cross-sectional view illustrating mounting of a camera lens and a sensor according to the present invention.
Figure 4A:
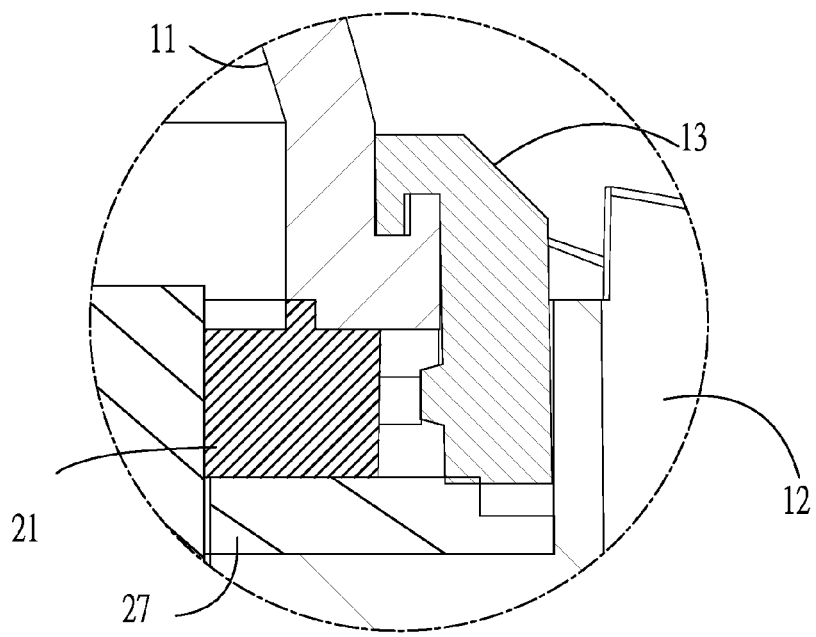
FIG. 4A is a partial enlarged view showing the mounting of the camera lens and the sensor according to the present invention.
Figure 5:
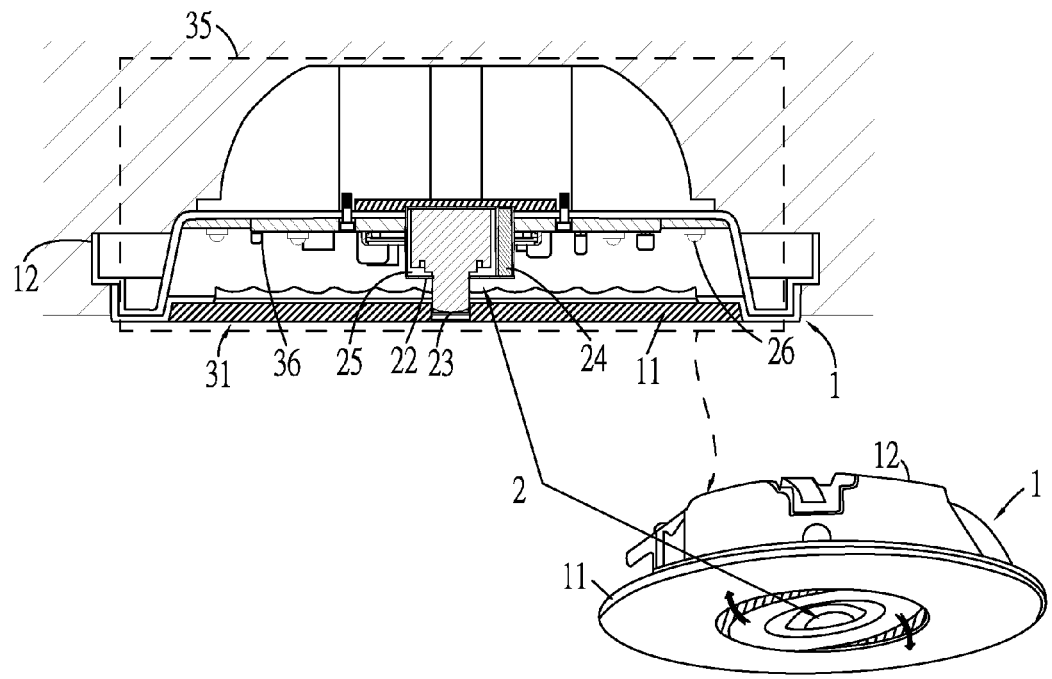
FIG. 5 is a cross-sectional view showing an additional first embodiment of the present invention.
Figure 6:
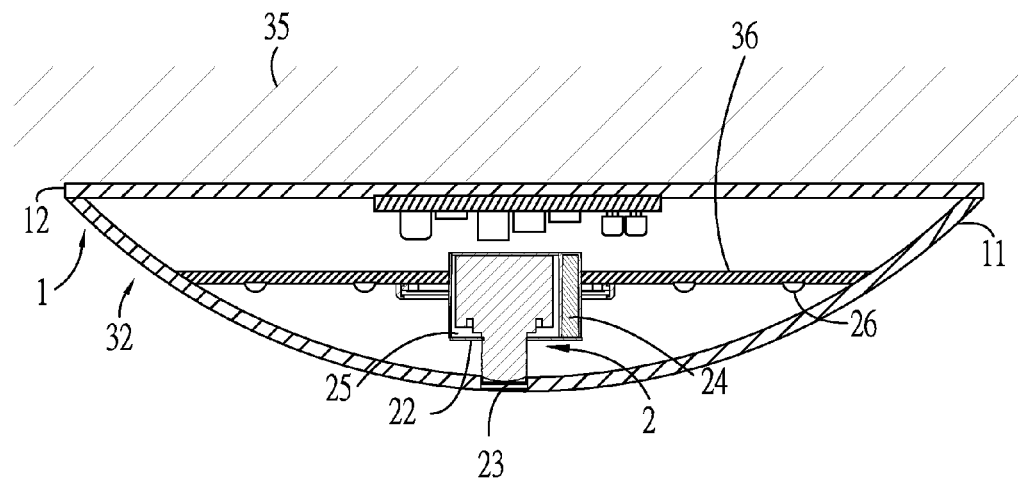
FIG. 6 is a cross-sectional view showing an additional second embodiment of the present invention.
Figure 7:
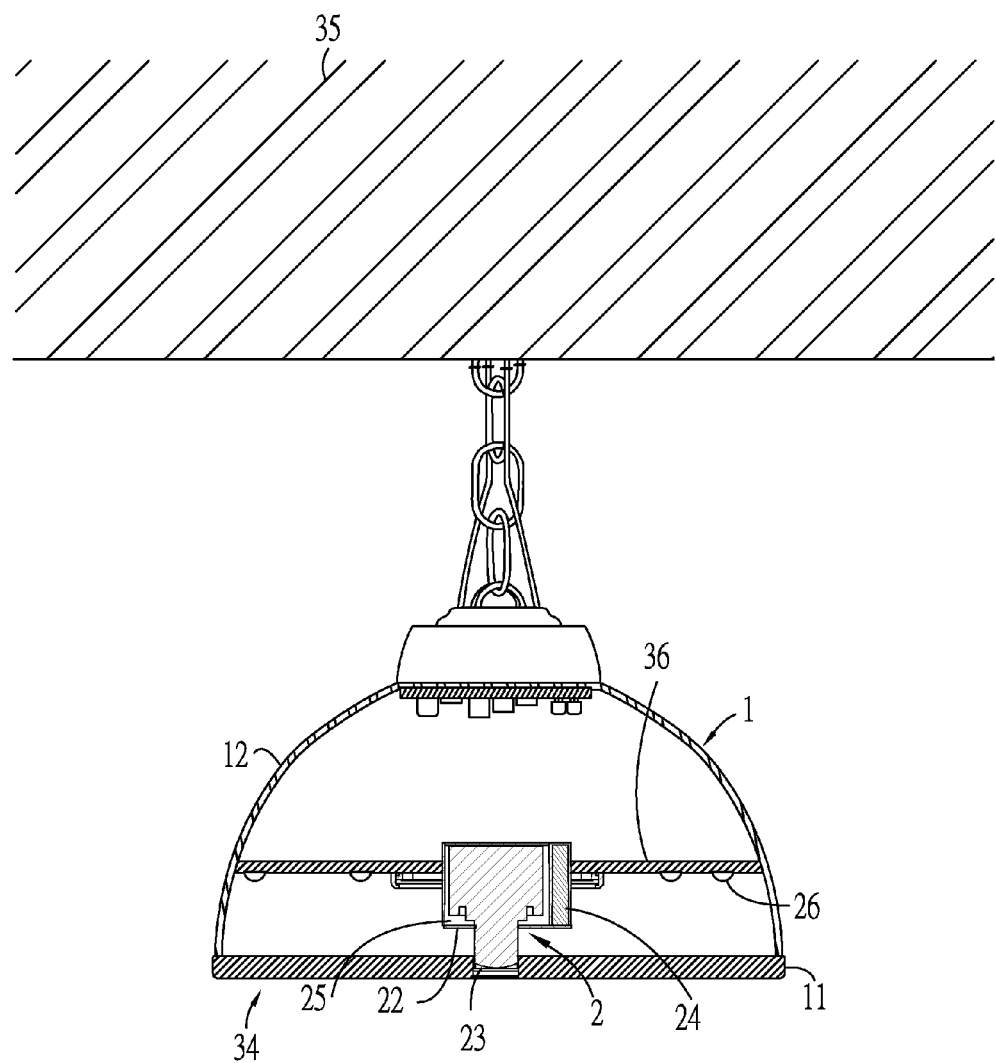
FIG. 7 is a cross-sectional view showing an additional third embodiment of the present invention.
Figure 8:
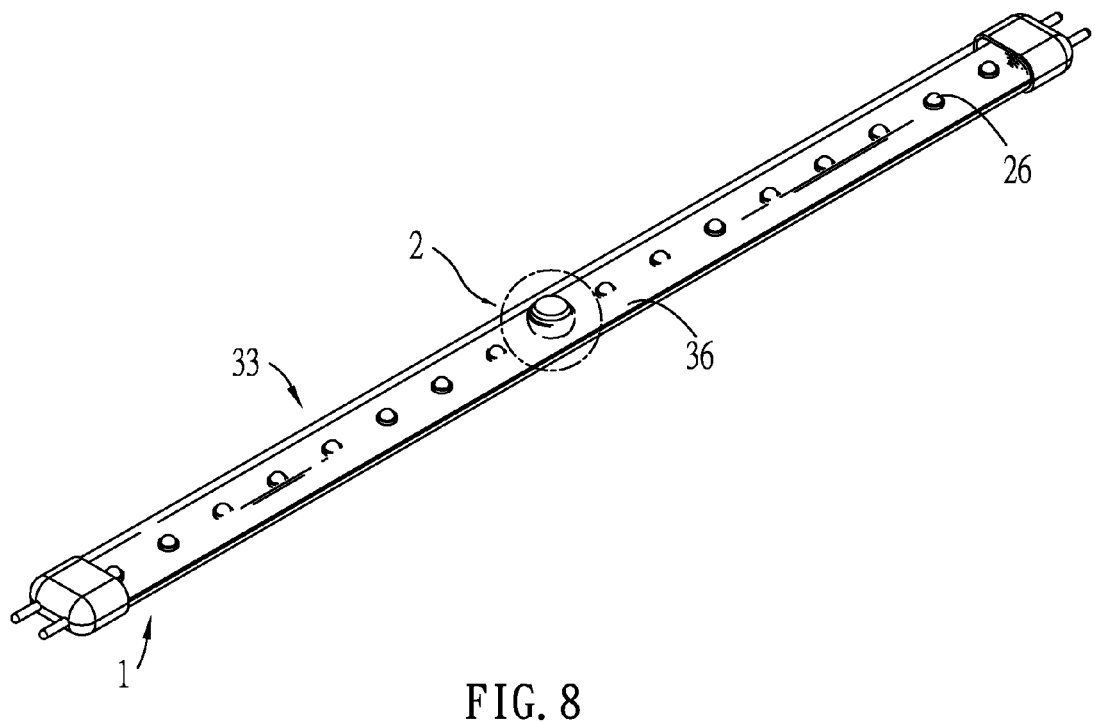
FIG. 8 is a perspective view showing an additional fourth embodiment of the present invention.
Figure 8A:
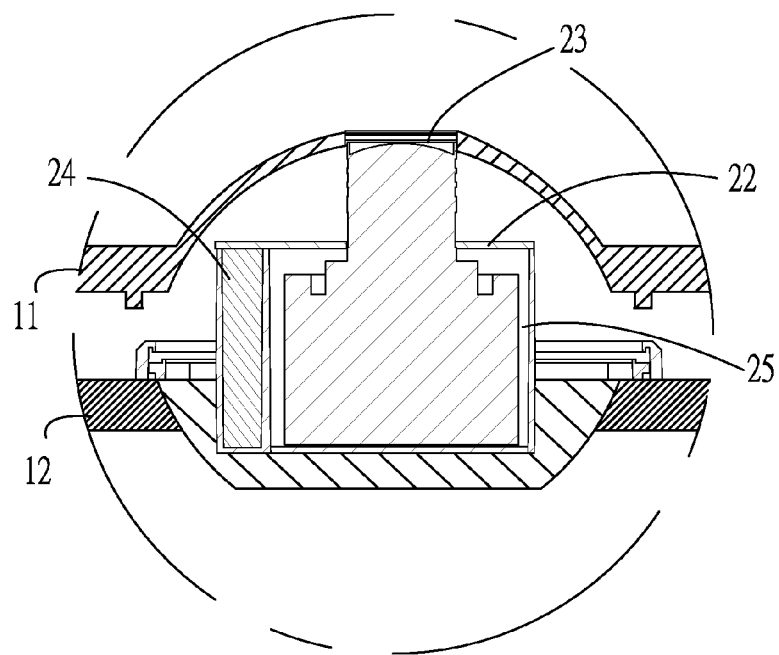
FIG. 8A is a partial enlarged view showing the additional fourth embodiment of the present invention.
Figure 9:
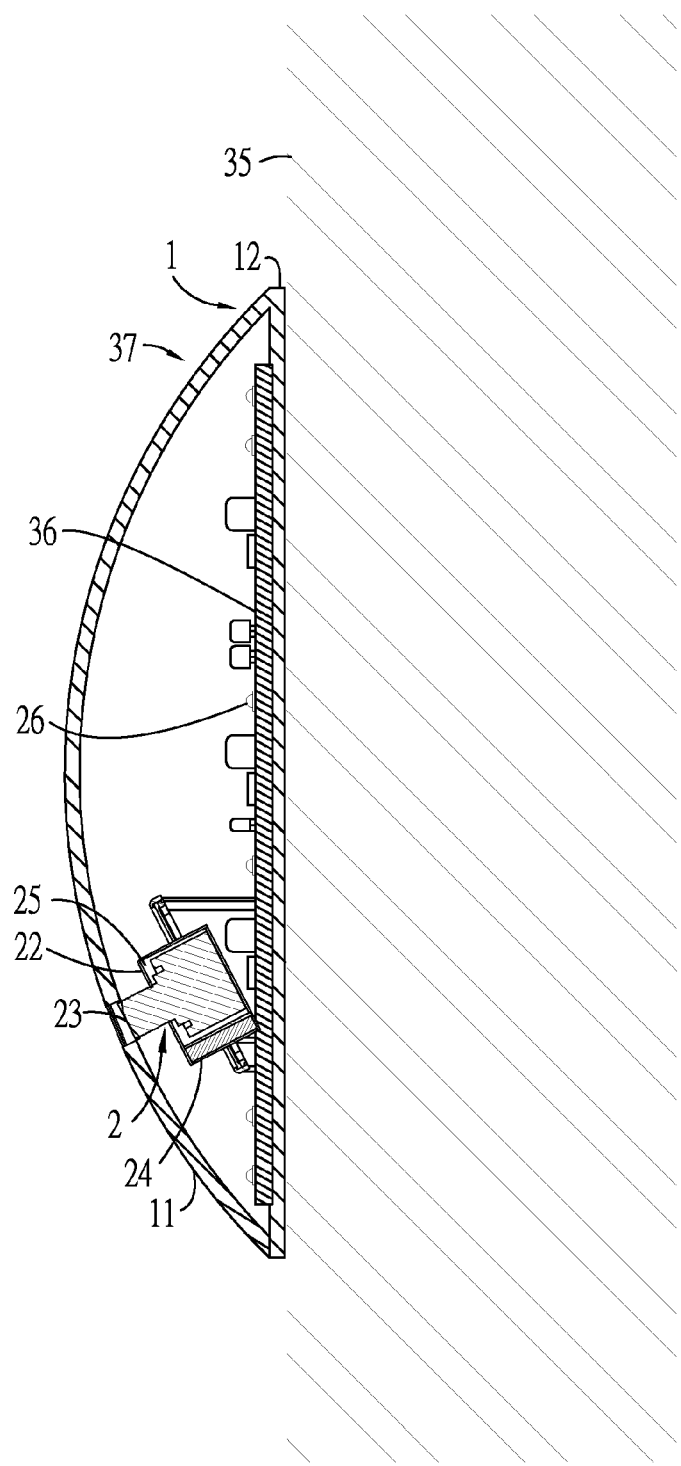
FIG. 9 is a cross-sectional view showing an additional fifth embodiment of the present invention.
Figure 10:
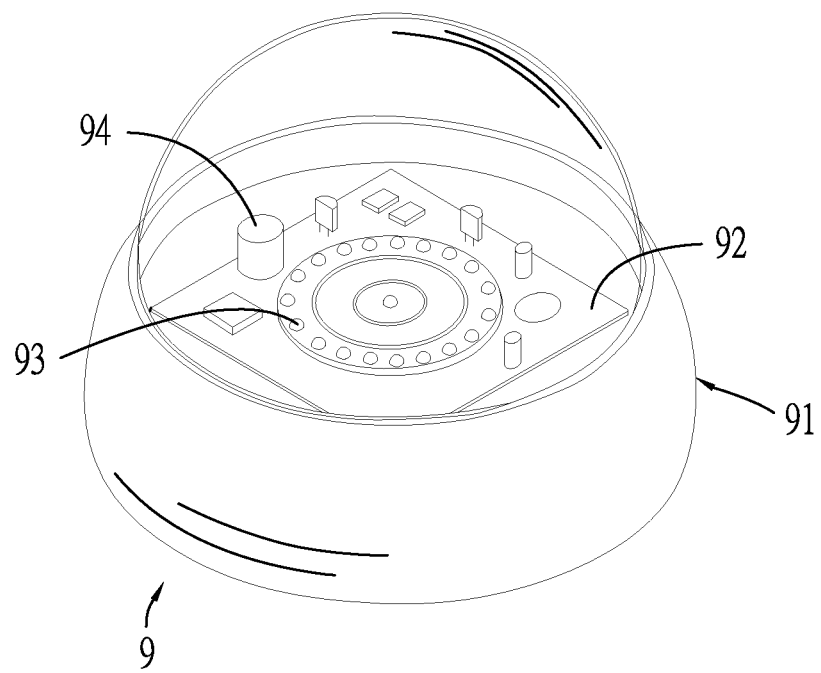
FIG. 10 is a perspective view showing a prior art device.

Referring to FIGS. 4 and 4A, the module base (21) comprises projects formed on an under surface thereof to mate corresponding parts of the lower housing member (12). The module base (21) has a circumference in which a plurality of notches is formed so that through rotation of a proper angle to adjust the corresponding positions, the module base (21) and the lower housing member (12) can be fit to each other. The module base (21) further comprises therein a plurality of braces extending to the circumference. The plurality of braces comprises a plurality of mounting holes (211) formed therein. The plurality of mounting holes (211) corresponds to mounting holes (121) formed in the lower housing member (12) with an LED-included light board (27) interposed therebetween. The light board (27) has a central portion that is hollowed to correspond to the receiving space (25) of the module base (21). The light board (27) also comprises a plurality of the mounting holes (221) that is coupled to the module base (21) the mounting holes (211) and the mounting holes (121) of the lower housing member (12) by screwing fastening means. The light board (27) is provided with at least one light emission element (26) and in the instant embodiment, the light emission element (26) is a light-emitting diode. The upper housing member (11) has a circumferential flange forming a recessed portion engageable with the module base (21) and an inverted L-shaped portion formed inside the ring (13) can be forcibly pressed down to securely fix the upper housing member (11) and the lower housing member (12) to each other so as to securely fix the multifunctional module (2) in position inside the housing (1).

Referring to FIGS. 5-9, additional first, second, third, fourth, and fifth embodiments according to the present invention are shown. In the drawings, the housings (1) are respectively made in the form of an embedded light (31), a ceiling light (32), a pendant light (34), a light tube (33), and a wall light (37). Each of the housings (1) comprises therein an LED-included circuit board (36), which is secured in position inside the housing (1) or at any other mounting position by means of screwing locking means in combination with a plurality of mounting holes (211) formed in a module base (21). In more details, in case of an embedded light (31), a multifunctional module (2) is mounted to the circuit board (36) inside a lower housing member (12) and the circuit board (36) is configured with a rotatable joint arrangement to allow for direction adjustment, in both a forward direction and a backward direction, of the multifunctional module (2) through rotation, thereby providing the multifunctional module (2) with a function of adjustment of range of use. Alternatively, mounting can be made to a circuit board (36) having no rotatable joint arrangement. In the case of a ceiling light (32), the multifunctional module is mounted to a circuit board (36) inside a housing (1). In case of a pendant light (34), the multifunctional module is also mounted to a circuit board (36) inside a housing (1). In case of a light tube (33), the multifunctional module is arranged in an enclosed space to be combined with a circuit board (36) electrically connected to the light tube (33). In case of a wall light (37), the multifunctional module (2) is also mounted to a circuit board (36) inside a housing (1). The above described multifunctional module (2) is generally arranged to make use of a plurality of mounting holes (211) present in an existing structure to be fixed inside various lighting fixtures/devices, while the sensor (24) and the camera lens (23) that are originally provided can still be functionable to allow a user to continuously use the originally selected function, whereby the multifunctional module (2) can be disassembled and re-assembled with different lighting fixtures/devices through modularization. Further, the light emission element (26) of each of the lighting fixtures/devices can be selectively switched on/off through electrical connection with the multifunctional module (2). In the above-described embodiment of embedded light (31) that is provided with a rotatable joint arrangement, such an arrangement can be applied, through simple modification, to all sorts of lighting fixture/device to provide a function of use range adjustment so that such an arrangement is not limited to application in the embedded light (31). As can be easily seen from the above embodiments together with the drawings, the multifunctional module (2) of the present invention can be applied to and mounted in various lighting fixtures/devices and is arranged to be located inside the housing (1) so that the arrangement thereof is limited to be inside the housing and such a limiting manner of arrangement allows the multifunctional module (2) to be mounted inside a housing (1) of an additional variety of lighting fixtures/devices, being not limited to the lighting fixtures/devices illustrated herein, thereby making the device of the present invention more versatile and achieving the purposes of modularized replacement and use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A modularized lighting device, comprising:
a housing, which comprises a multifunctional module and a light board comprising at least one light emission element mounted therein; and
the multifunctional module comprising a module base that defines a receiving space, the light board being mounted under the module base, the receiving space receiving therein a sensor and a camera lens, whereby the sensor is operable to activate operations of the camera lens and the light emission element;
wherein the multifunctional module is mounted to the light board and the receiving space comprises a first compartment and a second compartment that are delimited by a circumferentially surrounding wall and arranged immediately next to each other and separated from each other by an intermediate wall to respectively receive and hold therein the camera lens and the sensor to allow the camera lens and the sensor to be mounted to the light board in a manner of being separated from each other by intermediate wall; and
wherein the receiving space selectively receives a single sensor therein in such a way that the sensor is operable to activate operation of the light emission element; and
wherein the receiving space further receives therein a substrate that is arranged on a top of the receiving space for retaining and preventing the camera lens or the sensor from damages caused by being exposed, the substrate comprising an opening formed therein to allow the camera lens to partly extend outside the receiving space while being retained in position in the receiving space.

2. The modularized lighting device according to claim 1, wherein the multifunctional module is mounted in an interior of the housing so as to allow for mounting in an interior of a variety of lighting fixtures/devices.

* * * * *